US005305219A

United States Patent [19]

Ishibashi et al.

[11] Patent Number: 5,305,219

[45] Date of Patent: Apr. 19, 1994

[54] VEHICLE MOVEMENT DATA ANALYZING APPARATUS

[75] Inventors: Wataru Ishibashi; Akihiro Suzuki, both of Shizuoka, Japan

[73] Assignee: Yazaki Corporation, Tokyo, Japan

[21] Appl. No.: 692,432

[22] Filed: Apr. 29, 1991

[30] Foreign Application Priority Data

May 15, 1990 [JP] Japan .................................. 2-122985

[51] Int. Cl.$^{5}$ ............................................ G06F 15/419

[52] U.S. Cl. ............................... 364/424.04; 395/116; 340/995; 345/125

[58] Field of Search ...................... 364/424.01, 424.04, 364/400, 419, 424.03; 395/117, 140, 148, 116, 100, 161; 340/724, 988, 995, 996

[56] References Cited

U.S. PATENT DOCUMENTS 4,644,368 2/1987 Mutz .................................... 346/33

*Primary Examiner*—Vincent N. Trans

*Attorney, Agent, or Firm*—Nikaido, Marmelstein, Murray & Oram

[57] ABSTRACT

A vehicle movement digital data analyzing apparatus according to the present invention is for processing moving conditions of a vehicle momentarily varying with time which are recorded and collected in a record medium, and capable of converting a portion thereof into an enlarged graph to be displayed on display device. The vehicle movement digital data analyzing apparatus includes an input device for inputting information for determining the starting time of a graph to be displayed on the display device and the terminating time of a graph to be displayed on the display device, a page input device for specifying the graph on the preceding page and the graph on the next page adjacent to the graph currently displayed on the display device, and a page scrolling device for performing a graph conversion turning the starting time of the graph currently displayed on the display device into the terminating time of the converted graph when the graph on the preceding page is specified by the page input device and performing a graph conversion turning the terminating time of the graph currently displayed on the display device into the starting time of the converted graph when the graph on the next page is specified by said page input device. The analyzing apparatus further includes a printing device for printing the graph displayed on the display device.

4 Claims, 8 Drawing Sheets

FIG. 8(A)
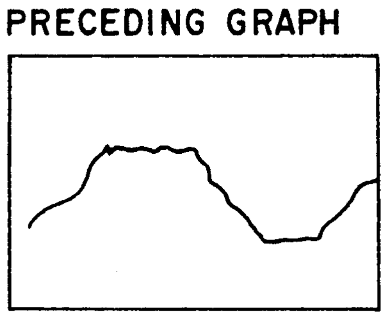
FIG. 8(B)
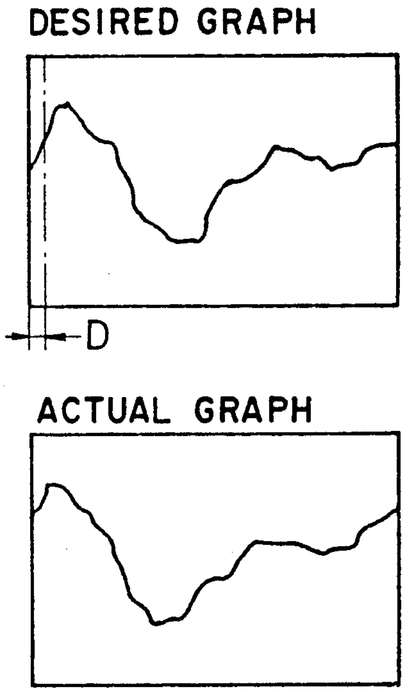
FIG. 8(C)

VEHICLE MOVEMENT DATA ANALYZING APPARATUS

BACKGROUND OF THE INVENTION

1. Field of The Invention

The present invention relates to a vehicle movement digital data analyzing apparatus for recording and collecting digital vehicle movement data, indicative of moving conditions of a vehicle such as a speed and a travel distance, onto a record medium and analyzing the thus collected digital vehicle movement data.

2. Description of Related Art

Conventionally, the vehicle movement digital data to be analyzed by a digital data analyzing apparatus of the described type is collected by recording the vehicle movement digital data indicative of moving condition of a vehicle in a recording medium such as an IC memory card removably mounted into an on-vehicle digital data recording apparatus, having such data subjected to a compression processing according to predetermined values. The vehicle movement digital data collected through the above described recording of data is read by a vehicle movement digital data analyzing apparatus provided in the office which controls the vehicle movement and subjected to an expansion processing, and then used for various analyses.

The recording of the data in the recording medium is performed according to the format, for example, as shown in FIG. 7.

Referring to FIG. 7, reference character M denotes a memory in which one word is structured of eight bits (one byte). In the memory, there are formed a data region $M_1$ and an ID region $M_2$. The data region $M_1$ is further divided into a distance data recording region $M_{11}$ partitioned into sections, each section corresponding to each vehicle movement used for successively recording therein the travel distance data compressed by a predetermined compression method, and a speed data recording region $M_{12}$ also partitioned into sections, each section corresponding to each operation, used for successively recording therein the speed data compressed by the predetermined compression method. One movement is defined, for example, as the time interval between the mounting of an IC memory card into the vehicle movement digital data recording apparatus and the removing of the same from the recording apparatus.

In the ID region $M_2$, there are also recorded such data as the allowance, resolution, and sampling time for each movement, and addresses in the regions $M_{11}$ and $M_{12}$ at which the final data of the travel distance data and the speed data for each movement are recorded. The aforesaid allowance represents the error range allowed at the time of recording, while the resolution and the sampling time are data related to precision of the collected speed data. The precision of the data obtained by the compression processing depends on the allowance, resolution, and sampling time in the speed data compression, and these data are absolutely essential for data expansion and analysis on the analyzing side.

In the speed data region $M_{12}$ of the data region $M_1$, there are recorded the starting time and the ending time at the start and the end of each movement. such time data are important when analysis is made with the speed data distributed over the period between the starting time and the ending time to thereby find out the state of speed at each point of time in-between.

The recording medium having the movement data recorded therein as described above is then removed from the vehicle movement digital data recording apparatus and mounted into the analyzing apparatus for analyzing vehicle movement digital data. Thereby, analyses of each movement are made. As one of the results provided by such analytical processing, the momentarily varying vehicle speed during each movement is arranged in the form of graph to be displayed on the screen of the CRT or printed in a sheet of paper so that the moving condition is seen at a glance.

More specifically, the vehicle movement data recording apparatus is constituted from a microcomputer. The microcomputer samples and receives an electric signal generated from a rotation sensor connected to a transmission of the vehicle by a suitable connecting means and having a period conforming to rotation of an axle of the vehicle and determines an instantaneous speed and a travel distance of the vehicle by calculation in accordance with the thus received electric signal. Then, in order to record the instantaneous speed and travel distance obtained by such a calculation as digital data onto a record medium loaded on a card writer, the microcomputer further executes data compression processing for decreasing the data length of the instantaneous speed and travel distance.

Meanwhile, the analyzing apparatus is constituted from a personal computer (PC) and a reader-writer (RW) connected to the personal computer. If the record medium is loaded into the read-writer, then vehicle movement data recorded on the record medium are read out by the read-writer and transmitted to and stored into a memory in the personal computer. The data thus stored in the memory are expanded and analyzed in accordance with an analyzing program and recorded onto a floppy disk (FD).

As one of the results provided by such analytical processing, the speed data, for example, subjected to expansion processing is graphically displayed on the screen of a CRT. If the data for 24 hours are all displayed on one screen, the details of the display become quite difficult to distinguish, and therefore, an enlarged display of a part of the data has come to be practiced. It is also practiced to have the 24-hour graphical display or the enlarged graphical displayed on the CRT screen printed on a sheet of paper using a printer.

In the case where the enlarged graph is printed, the graph printed on the printing paper is that of one screen. Therefore, when it is desired to view the entire graph in an enlarged state, the enlarged graphs immediately preceding and following the current enlarged graph are displayed and additionally printed. In such case, it becomes necessary to output the adjacent data onto the CRT continuously to the current data. To achieve this, the scrolling function has been conventionally used. The conventional scrolling function is such that causes the graph on the screen to be moved backward or forward in units of one dot (pixel) by manual operation.

When using the above described scrolling function, however, it is very difficult to bring the end or the start of one screen into coincidence with the start or the end of another screen adjacent thereto. Therefore, supposing that the screen shown in FIG. 8(*a*) is a preceding screen and the screen continuing thereto is as shown in FIG. 8(*b*), the screen actually obtained by shifting the screen by means of the scrolling function frequently becomes such as shown in FIG. 8(c), that is, the portion of the screen in the range D shown therein becomes missing; otherwise, screens having overlapping portions are obtained. Thus, there has been a problem that the graphs obtained by printing such screens produce discontinuity therebetween.

SUMMARY OF THE INVENTION

The present invention has been made in view of the above described point of problem.

Accordingly, it is an object of the present invention to provide a vehicle movement digital data analyzing apparatus capable, even when an entire graph produced in accordance with digital movement record data representative of the moving condition of a vehicle cannot be displayed on one screen, of displaying graphs adjacent to one another without producing any missing or overlapping of data therebetween.

It is another object of the present invention to provide a vehicle movement digital data analyzing apparatus capable, even when an entire graph produced in accordance with digital movement data representative of the moving condition of a vehicle cannot be displayed on one screen, of printing graphs adjacent to one another without producing any missing or overlapping of data therebetween so that graphs as a whole are continuous and in conformity with the operation data.

In order to overcome the above described problem, the vehicle movement data recording and analyzing system according to the present invention includes a vehicle movement digital data analyzing apparatus, as shown in the basic structural drawing of FIG. 1, such that the vehicle moving condition varying with time is recorded in a recording medium 2 and the thus collected movement digital data are processed, and it is possible to convert a portion of the data into an enlarged graph to be displayed on a display means **31*b*, which analyzing apparatus comprising an input means $31_{c1}$ for inputting information for determining the starting time of a graph to be displayed on the display means 31*b* and the terminating time of a graph to be displayed on the display means 31*b*, a page input means $31_{c2}$ for specifying the graph on the preceding page and that on the next page adjacent to the graph currently displayed on the display means 31*b*, and a page scrolling means 31*a1* for performing a graph conversion turning the starting time of the graph currently displayed on the display means 31*b* into the terminating time of the converted graph when the graph on the preceding page is specified by the page input means $31_{c2}$ and performing a graph conversion turning the terminating time of the graph currently displayed on the display means 31*b*** into the starting time of the converted graph when the graph on the next page is specified by the page input means $31_{c2}$.

The vehicle movement digital data analyzing apparatus further comprises a printing means **31*e* for printing the graph displayed on the display means 31*b***.

In the structure shown in FIG. 1, the data for determining the starting time of a graph to be displayed on the display means **31*b* and the terminating time of a graph to be displayed on the display means 31*b* are input by the input means $31_{c1}$, the graph on the preceding page and that on the next page adjacent to the graph currently displayed on the display means 31*b* are specified by the page input means $31_{c2}$, a graph conversion whereby the starting time of the graph currently displayed on the display means 31*b* is turned into the terminating time of the converted graph is performed by the page scrolling means $31_{a1}$ when the graph on the preceding page is specified by the page input means $31_{c2}$, and a graph conversion whereby the terminating time of the graph currently displayed on the display means 31*b*** is turned into the starting time of the converted graph is performed by the same when the graph on the next page is specified.

Accordingly, it is made possible to display on the display means **31*b* the graphs on the preceding and the next page adjacent to the currently displayed graph without producing any missing or overlapping of a portion therebetween and, further, the graph displayed on the display means 31*b* can be printed by the printing means 31*e***.

BRIEF DESCRIPTION OF THE DRAWINGS

FIGS. 8A–8C are diagrams for explaining a problem with the conventional apparatus.

DESCRIPTION OF THE PREFERRED EMBODIMENT

An embodiment of the present invention will be described below with reference to the accompanying drawings.

Figure 1:
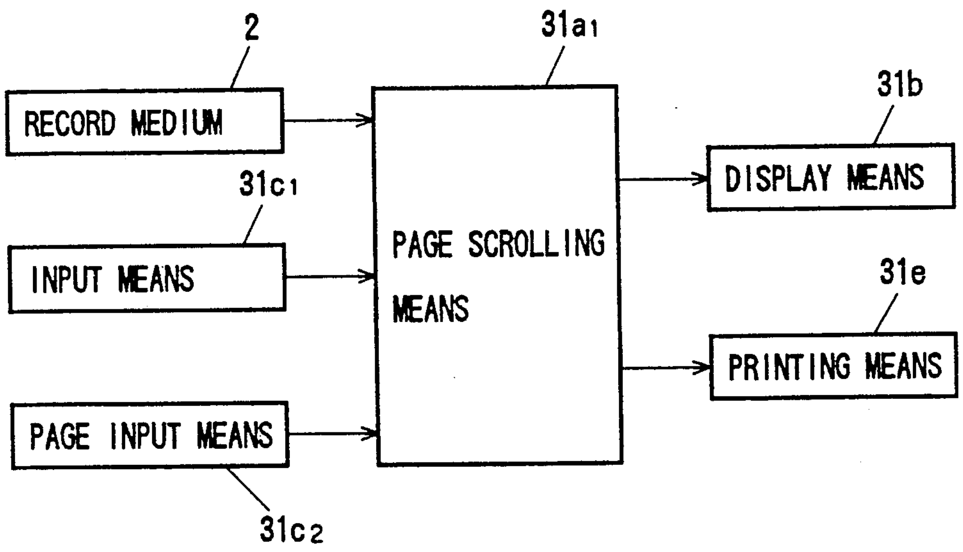
FIG. 1 is a block diagram showing a basic structure of a vehicle movement digital data analyzing apparatus according to the present invention.
Figure 2:
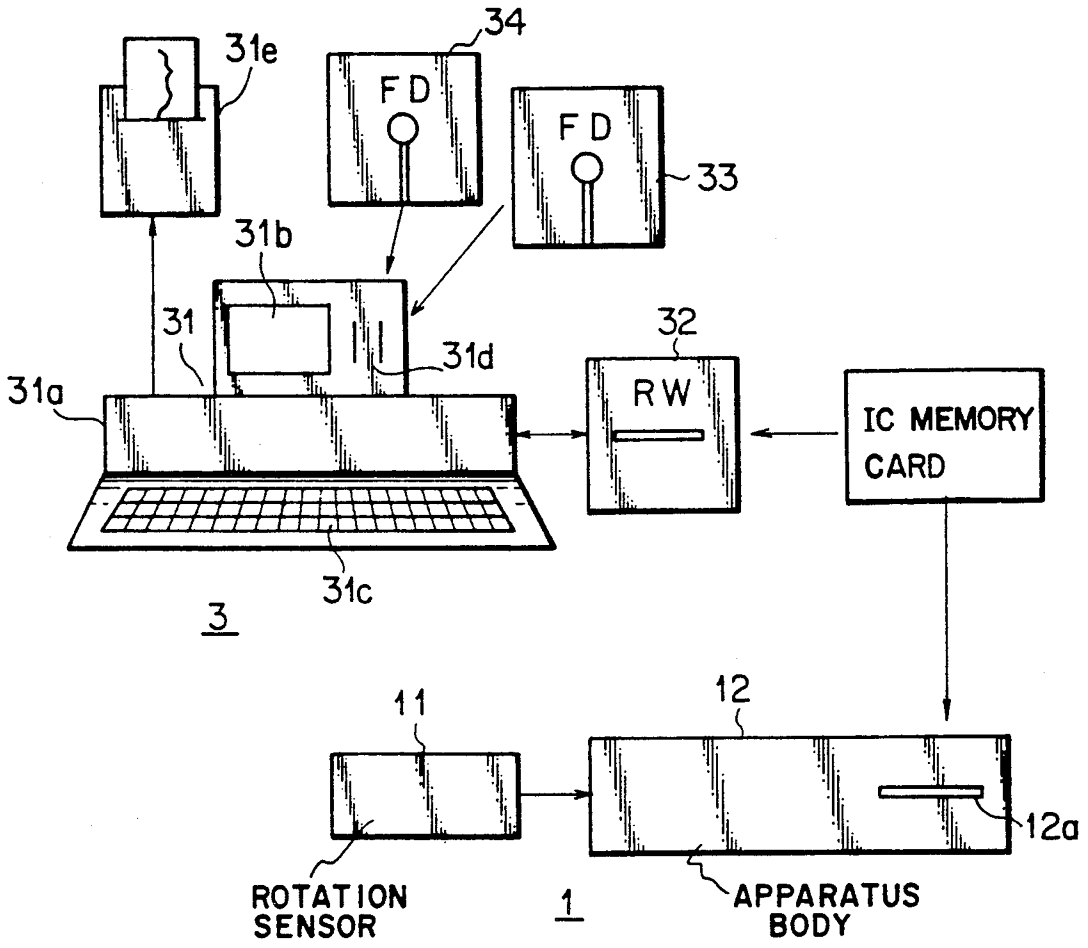
FIG. 2 is a block diagram showing an embodiment of a vehicle movement digital data analyzing apparatus according to the present invention.

Referring to FIG. 2, the vehicle movement data recording apparatus includes a rotation sensor 11 connected to a transmission not shown of the vehicle by way of suitable connecting means not shown, and an apparatus body 12 for sampling and receiving an electric signal from the rotation sensor 11, determining an instantaneous speed and a travel distance of the vehicle by calculation and executing various jobs including compression of data in preparation for recording of the instantaneous speed and travel distance obtained by calculation as digital data onto an IC (integrated circuit) memory card 2 serving as a record medium. The apparatus body 12 has a card inserting groove **12*a* for a reader-writer (not shown) into and from which the IC memory card 2 is loaded and unloaded. When the IC memory card 2 is loaded in the reader-writer, the data recorded on the IC memory card 2 are read out from the IC memory card 2 or such compressed data as described hereinabove are written into the IC memory card 2** by the reader-writer.

On the other hand, the analyzing apparatus 3 includes a personal computer (PC) 31 which in turn includes a body **31*a*, a CRT (cathode ray tube) 31*b*, a keyboard 31*c*, a floppy disk (FD) driver 31*d*, a printer 31*e* as a printing means and so forth. The analyzing apparatus 3** further includes a reader-writer (RW) 32 connected to the body 31*a* of the personal computer 31. A pair of floppy disks 33 and 34 are removably loaded in the floppy disk driver 31*d* while the IC memory card 2 is removably loaded in the reader-writer 32.

The keyboard 31*c* serves both as input means $31_{c1}$ for inputting information for determining the starting time of a graph to be displayed on the CRT 31*b* as display means and the terminating time of a graph to be displayed on the CRT display 31*b* and as page input means $31_{c2}$ for specifying the preceding and subsequent pages adjacent to the graph currently shown on the CRT display 31*b*.

The apparatus body 31*a* of the PC 31 executes processes shown in the later described flow charts and thereby functions as page scrolling means $31_{a1}$. More specifically, when the graph on the preceding page is designated by the keyboard 31*c* as the page input means $31_{c2}$, it performs a graph conversion to turn the starting time of the graph currently displayed on the CRT display 31*b* into the terminating time of the converted graph, and, when the graph on the next page is designated, performs a graph conversion to turn the terminating time of the graph currently displayed on the CRT display 31*b* into the starting time of the converted graph.

Figure 7:
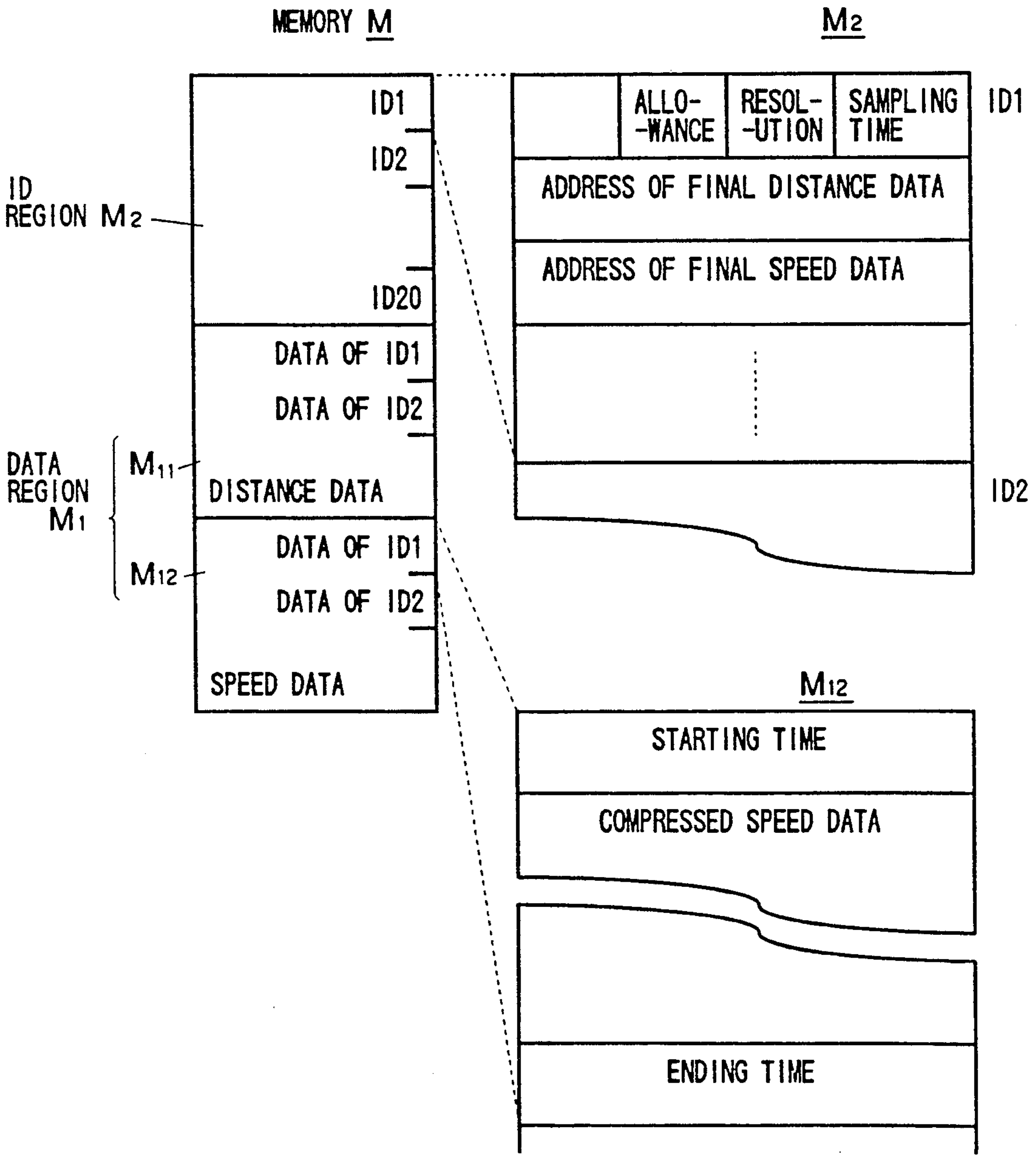
FIG. 7 PRIOR ART
FIG. 7 is a diagram showing an example of structure of digital movement data recorded in an IC memory card by a digital movement data recording apparatus.

The IC memory card 2 has such various data as described above with reference to FIG. 7. Meanwhile, the floppy disk 33 to be loaded into the floppy disk driver 31*d* has stored in advance therein programs such as data analyzing program and various data which are set by execution of the programs, and if the floppy disk 33 is loaded into the floppy disk driver 31*d*, then the programs such as the data analyzing program and various data are read by the floppy disk driver 31*d* and stored into a memory (not shown) in the apparatus body 31*a*.

If the IC memory card 2 is loaded into the reader-writer 32 to perform a reading operation, then the various data including compressed vehicle movement data recorded in the IC memory card 2 are read out and transmitted to the body 31*a* of the personal computer 31 and are temporarily stored into the memory in the apparatus body 31*a*. The data stored in the memory in the body 31*a* are analyzed in accordance with the analyzing program or recorded into the floppy disk 34 for the data collection loaded into the floppy disk driver 31*d*. Once the floppy disk 34 on which vehicle movement data are recorded is loaded into the floppy disk driver 31*d*, the vehicle movement data stored therein to be analyzed are read into the memory in the body 31*a* so that they can thereafter be processed in accordance with the analyzing program of the floppy disk 33.

Compression processing of an instantaneous speed in the vehicle movement digital data recording apparatus is executed based on the following idea. In particular, if a tolerance or allowance to be allowed for each sampled speed value is set in advance and a straight line intersecting the allowance is considered, then the straight line represents vehicle speed information within the allowance. Then, if the length of the straight line is represented by and recorded in a sampling number or number of samples and a value of a last end of the straight line is also recorded, then the vehicle speed for a period of time covered by the straight line can be supervised periodically. If the vehicle speed is stored only in length of the straight line and last point data in this manner, then much information can be stored in a small amount of data, and accordingly, compression of data is realized.

Figure 3:
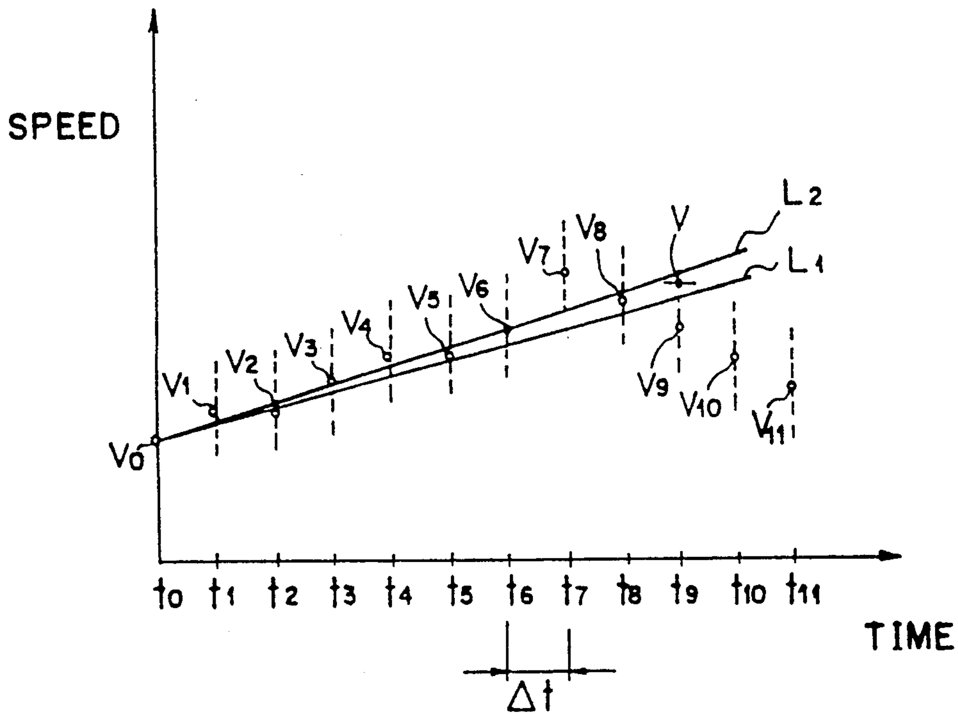
FIG. 3 is a diagram for explaining a method for compressing digital movement data.

FIG. 3 illustrates a relationship among vehicle speeds $V_0$ to $V_{11}$, at sampling points of time $t_0$ to $t_{11}$, and each of broken lines represents an allowance of a vehicle speed. It is examined whether or not there exists, at each sampling point of time, a straight line which intersects the allowance of data at any preceding sampling point of time. While such straight line exists at the sampling points of time $t_0$ to $t_9$, no such straight line exists at the sampling point of time $t_{10}$. In this instance, among various straight lines which include the starting point $V_0$ and intersect an allowance, a straight line $L_2$ passing an upper limit and another straight line $L_1$, passing a lower limit are drawn, and a middle point V of that range of the allowance for the last sampling data $V_9$ which is defined by the straight lines $L_1$ and $L_2$ is determined as data of the last point and the length is determined to be "9". The last point is determined as a starting point of a next straight line, and similar operation is performed successively after then. By such compression processing as described above, compressed speed data are recorded in a sampling number and a speed into the IC memory card 2.

The IC memory card 2 into which vehicle movement digital data have been recorded by the reader-writer of the vehicle movement digital data recording apparatus 1 is unloaded from the reader-writer and then inserted into the reader-writer 32 of the analyzing apparatus 3 in order to make an analysis of the vehicle movement digital data in the IC memory card 2.

The analyzing apparatus 3 first reads, after the floppy disk 33 is loaded into and read by the floppy disk driver 31*d* and execution of the analyzing program stored in the floppy disk 33 is started, the data in the floppy disk 33, and stored the thus read data into the internal memory thereof, and then causes the CRT 31*b* to display a menu thereon. Such menu includes card initializing operation, ending processing, floppy disk reading processing and card reading processing. Thus, if the card initializing processing is selected, initialization (writing of "FF" into a predetermined area) of an IC memory card 2 is performed. The thus initialized IC memory card 2 is then loaded, when the vehicle is to be moved, into the reader-writer of the vehicle movement digital data recording apparatus 1 carried on the vehicle. In response to such loading of the IC memory card 2, the vehicle movement digital data recording apparatus 1 first reads the initialization data from the IC memory card 2 and stores the thus read initialization data into a predetermined area of the internal memory, whereafter the vehicle movement digital data recording apparatus 1 executes necessary processing using the thus stored data.

While the operations of the vehicle movement digital data recording apparatus 1 and the analyzing apparatus 3 are generally described above, details of the analyzing apparatus will be described below with reference to flow charts of FIG. 4 and FIG. 5.

Figure 4:
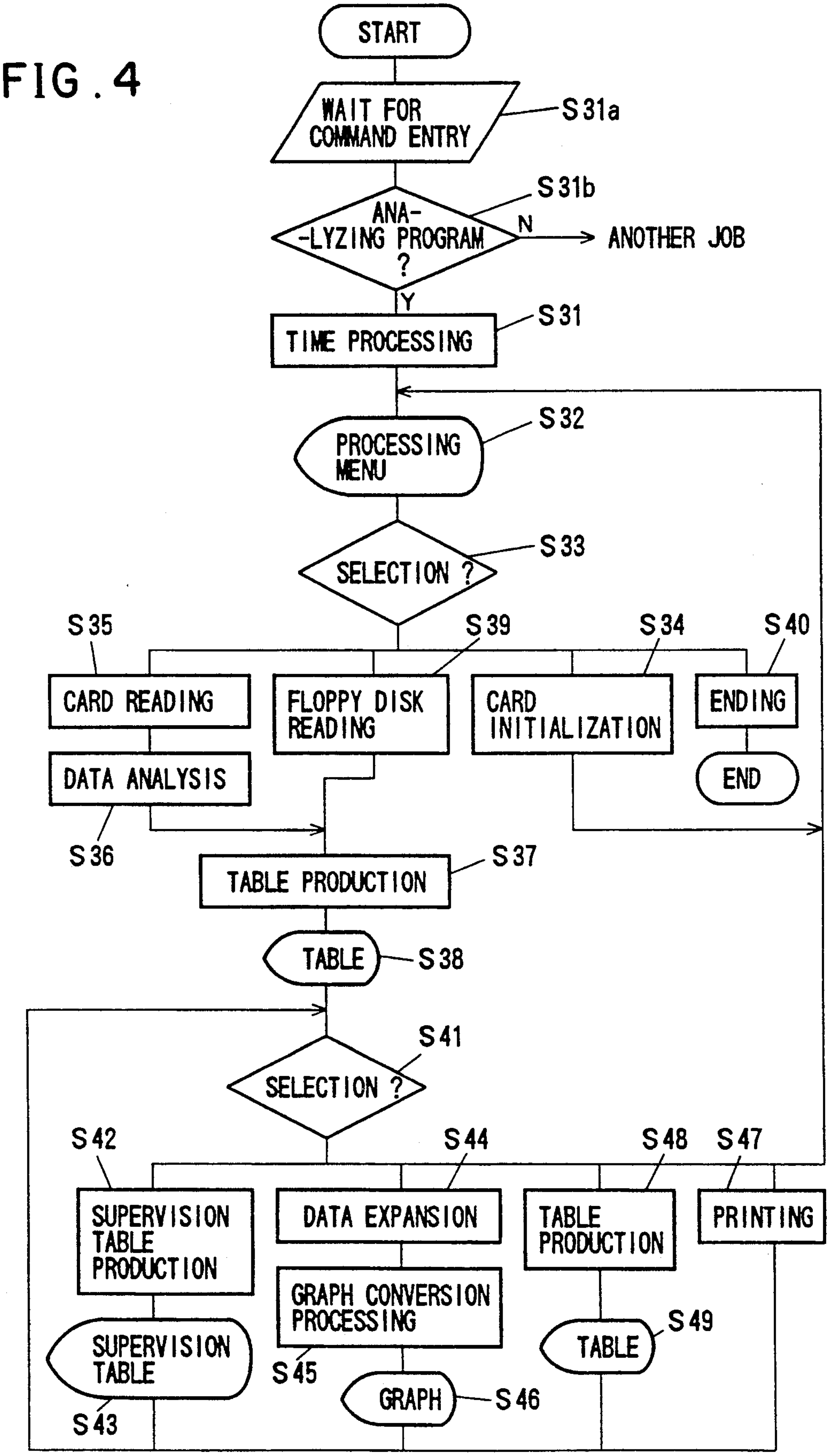
FIG. 4 and FIG. 5 are flow charts of steps of work executed by the apparatus body of a personal computer within the vehicle movement digital data analyzing apparatus.

Referring now to FIG. 4, there is shown a flow chart illustrating operation of the vehicle movement data analyzing apparatus 3. The personal computer 31 of the vehicle movement digital data analyzing apparatus 3 starts its operation based on the MS-DOS system and waits for a command to be input at the first step S31*a*, and when receives the command, it determines at the following step S31*b* whether or not the analyzing program is called. If the determination is NO, the control sequence advances to another step for executing the job in accordance with the command, but if the determination at step S31*a* changes to YES, then the control sequence advances to step S31 at which time processing is executed, and then to step S32 at which a processing menu is displayed on the CRT 31*b*. The personal computer 31 then waits, at step S33, a selecting operation which is performed by way of any of function keys of the keyboard 31*c* of the personal computer 31 by an operator watching the thus displayed menu. Then, if a function key is selected by operation of a specific function key, then the thus selected processing is executed subsequently.

In particular, in case the card initializing processing is selected, the IC memory card 2 is initialized at step S34. In this instance, predetermined data are written into a predetermined area of the IC memory card 2. Or, if the card reading processing is selected, then vehicle movement digital data and other data are read in from the IC memory card 2 at step S35, and then at step S36, data storage processing is executed. After then, the control sequence advances to step S37 at which a table is produced and then to step S38 at which the table thus produced is displayed on the CRT 31*b*. On the other hand, if the floppy disk reading processing is selected at step S33, data are read in from the floppy disks 33 and 34 at step S39, and after then, the control sequence advances to step S37. Or otherwise, if the ending processing is selected at step S33, then predetermined processing for the ending of operation is executed at step S40, whereafter the personal computer 31 ends its operation.

After the table is displayed at step S38, the personal computer 31 waits, at step S41, a selecting operation by way of a function key of the keyboard 31*c* thereof which is performed by an operator watching the displayed table, and if a function is selected by a specific function key, then thus selected processing will be executed. In particular, if supervision table producing processing is selected, then processing for the production of a supervision table, for example, a table of a frequency, a time and so forth in which an alarm speed is executed for an hour, is executed at step S42, and the thus produced supervision table is displayed on the CRT 31*b* at step S43, whereafter the control sequence returns to step S41.

On the other hand, if data expansion processing is selected, then data expansion processing is executed at step S44 in accordance with various data such as allowance, resolution, sampling time and so forth read in from the memory card 2 at step S35, and data obtained by such data expansion processing are converted into a graph at step S45. Then the graph obtained by such conversion is displayed on the CRT 31*b* at step S46, whereafter the control sequence returns to step S41.

If otherwise printing processing is selected at step S41, then necessary printing is executed at step S47, whereafter the control sequence returns to step S41. Or else, if table producing processing is selected at step S41, then processing for the production of a table is executed at step S48, and the table thus produced is displayed on the CRT 31*b* at step S49, whereafter the control sequence returns to step S41. Besides, if a processing menu is selected by operation of the corresponding function key, then the control sequence returns to step S32 so that such selecting operation as described above may be performed again.

The vehicle movement digital data subjected to the expansion processing in the data expansion process at the above step S44 goes through the graph conversion process in the following step S45, in which graph conversion process, it is adapted such that either of a 24-hour graphical display and an enlarged graphical display can be selected according to the input command.

When the 24-hour graphical display is selected, the operation data over a 24-hour period is output whereby moving conditions of the vehicle is displayed as a graph spread on one screen. When the enlarged graphical display is selected, such parameters or modes as the starting time and time span of the enlarged portion of the graph, scale of enlargement, mode of screen (one-picture or two-picture mode), specified ID number, and page scrolling are adapted to be selected.

In the enlarged graphical display mode, if the starting time and the time span of the graph are specified, then the most suitable scale of enlargement in displaying the graph on one screen is automatically selected and the graph conversion is thereby performed. When the graph starting time and the scale of enlargement are selected, the data of the time span allowing the graph to be displayed in one screen is read and the graph conversion is thereby performed, and when the ID number specification is selected, the scale of enlargement with which the data of the specified ID can be displayed in one screen is automatically selected and the graph conversion is thereby performed. When the page scrolling operation is selected, the picture adjoining to the current screen is automatically displayed, and if then the printing command is input, the graphs in succession are printed on printing paper. When the two-picture mode is selected as the mode the screen, both the enlarged graph and the 24-hour graph are displayed with the marking attached to the 24-hour graph indicating to which portion of the 24-hour graph the enlarged graph corresponds.

Now the graph conversion process executed by the apparatus body 31*a* of the PC 31 when the graph starting time and either the time span or the scale of enlargement are specified and, thereby, an enlarged graph is displayed and the adjoining graphs, both preceding and subsequent to the current screen, are displayed in succession will be described with reference to the flow chart of FIG. 5.

Figure 5:
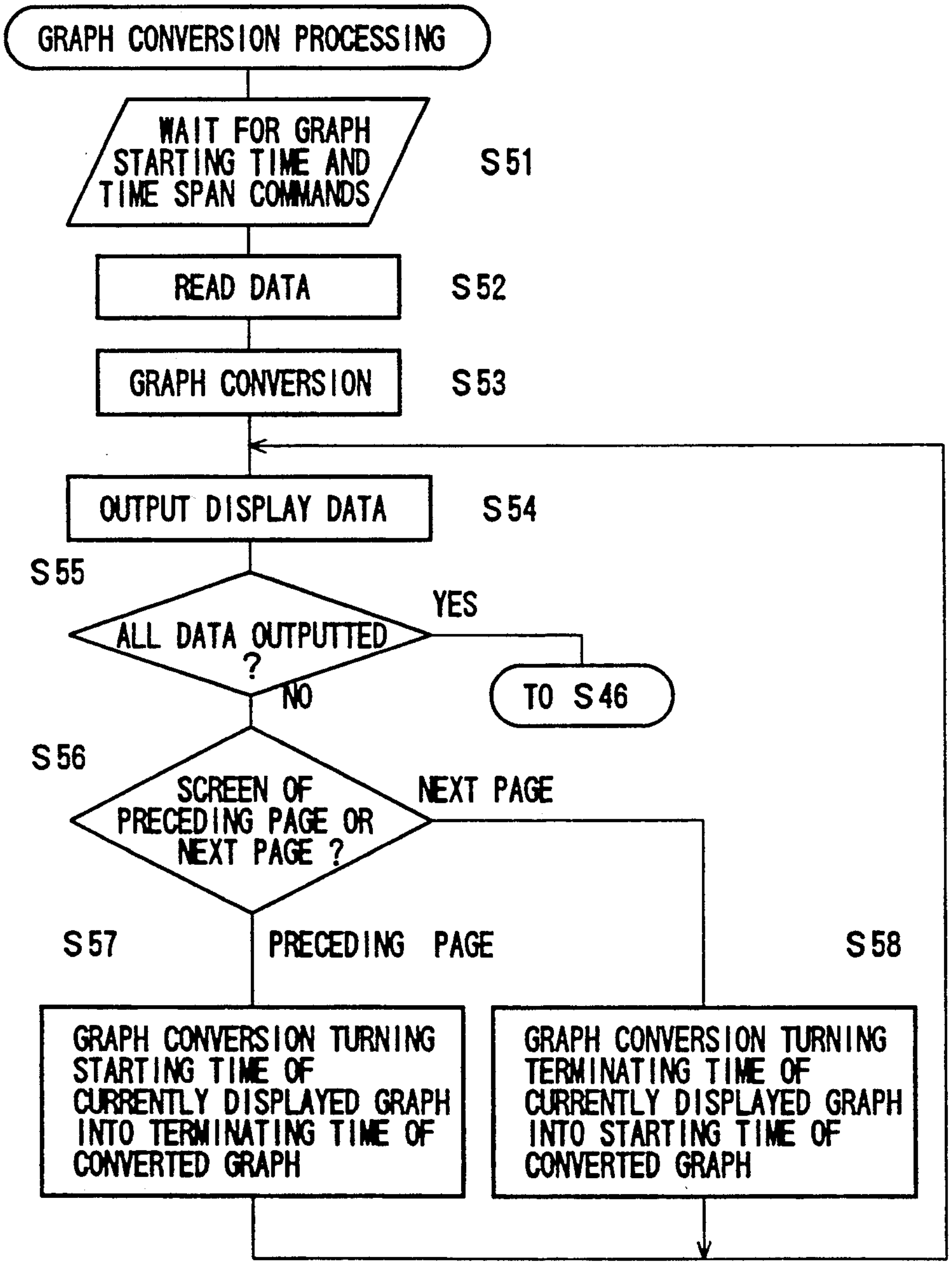

Referring to the flow chart of FIG. 5, first, in step S51, entry of commands by operation of specific keys of the keyboard 31*c* for the graph starting time and either the time span or the scale of enlargement is awaited. Upon receipt of the input command, the apparatus body 31*a* advances its procedure to step S52, in which it reads the data expanded in the step S44 in the flow chart of FIG. 4. Since the quantity of data which can be displayed on the screen is predetermined, the terminating time of the graph is automatically determined by the specification of the starting time and either the time span or the scale of enlargement. Thus, either of the time span and the scale of enlargement serves as the information to determine the terminating time of the graph displayed on the CRT 31*b*. The apparatus body 31*a* then advances its procedure to the step S53, in which it performs graph conversion for displaying the data read in the step S52 as a graph in one screen, and in the following step S54, it outputs the graphical display data to the CRT 31*b*. Thereafter, in step S46 in the flow chart of FIG. 4, it tests and determines whether outputting of all of the data has been finished, and if the decision made therein is YES, it returns to the step S46. When the decision in the step S55 is NO, then the apparatus body 31*a* advances its procedure to step S56, wherein it awaits the page scrolling key entry by operation of the specific key of the keyboard 31*c*, and upon receipt of a key entry, it checks whether the scrolling is for the screen of the preceding page or that of the subsequent page. When the decision in the step S56 is for the screen of the preceding page, it advances the procedure to step S57 and performs therein a graph conversion to obtain a graph having, as its terminating time, the starting time of the graph on the current screen. When the decision in the step S56 is for the subsequent screen, the apparatus body 31*a* advances its procedure to step S58 and performs therein a graph conversion to obtain a graph having, as its starting time, the terminating time of the graph on the current screen. The apparatus body 31*a*, when the step S57 or S58 is finished, returns to the above step 54 and, thereafter, repeats execution of the processes in the above described steps.

By executing the printing process when the screens with the starting point and the terminating point of the current screen respectively set to be the terminating point and the starting point thereof are displayed as described above, the graphs displayed on the screen are printed as they are in printing paper by the printer 31*e*. Therefore, graphs printed in printing paper continue to one another without any missing or overlapping portion produced therebetween.

Figure 6:
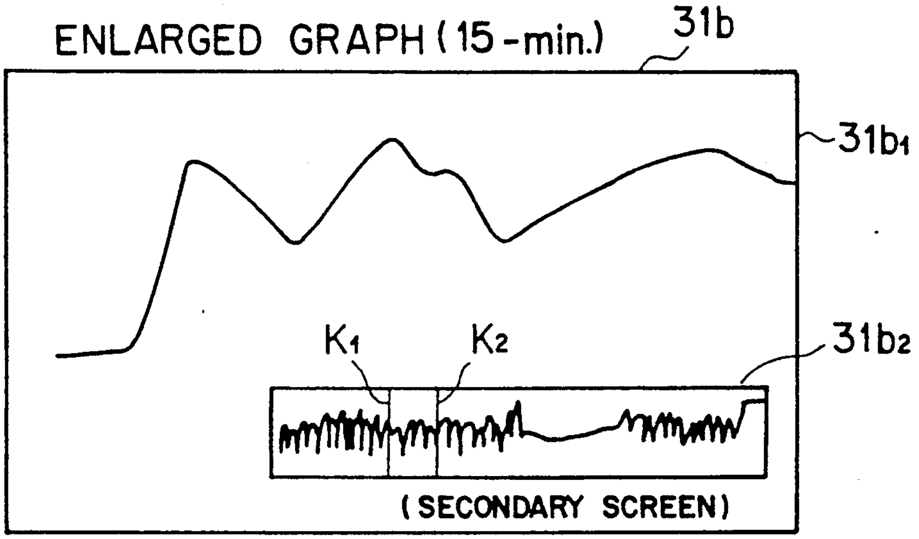
FIG. 6 is a diagram showing an example of two-picture display on a CRT.

When the two-picture display mode is selected, a two-picture display, in which, as shown in FIG. 6, an enlarged graph display is made on the primary screen 31*b*$_1$ with the specified starting time of graph and the time span (15 minutes) and a 24-hour graphical display is made in the secondary screen 31*b*$_2$ provided in a section of the primary screen 31*b*$_1$, can be obtained. In order to indicate which portion of the 24-hour graph is displayed on the primary screen 31*b*$_1$, cursors $K_1$ and $K_2$ can be displayed within the graph on the secondary screen 31*b*$_2$ as shown in FIG. 6. Otherwise, the corresponding section can be displayed in a different color.

According to the present invention as described above, a graph using the starting time of the currently displayed graph as its terminating time and a graph using the terminating time of the currently displayed graph as its starting time can be displayed by means of the page scrolling function and, thereby the graphs on the preceding and following pages adjacent to the currently displayed graph can be obtained without any missing or overlapping portion produced therebetween and, in addition, the graphs on display can be printed on printing paper.

What is claimed is:

1. A vehicle movement digital data analyzing apparatus for processing moving conditions of a vehicle momentarily varying with time which are recorded and collected in a record medium, and said vehicle movement digital data analyzing apparatus capable of converting a portion of said moving conditions into an enlarged graph to be displayed on a display means, said vehicle movement digital data analyzing apparatus comprising:

input means for inputting information for determining starting time of a graph of said moving conditions to be displayed on said display means and one of time span and scale of enlargement of said graph of said moving conditions to be displayed on said display means;

page specifying input means for specifying the graph of said moving conditions on a preceding page and the graph of said moving conditions on a next page adjacent to a graph of said moving conditions currently displayed on said display means; and page scrolling means for performing a graph conversion turning said starting time of said graph currently displayed on said display means into said terminating time of a converted graph when said graph on said preceding page is specified by said page input means and for performing a graph conversion turning said terminating time of said graph currently displayed on said display means into said starting time of said converted graph when said graph on said next page is specified by said page input means.

2. A vehicle movement digital data analyzing apparatus as claimed in claim 1, wherein said analyzing apparatus is constituted from a personal computer and a reader-writer connected thereto, said reader-writer reading out compressed vehicle movement data recorded on said record medium and then storing said data into a memory in said personal computer for expanding and analyzing in accordance with an analyzing program afterwards.

3. A vehicle movement digital data analyzing apparatus as claimed in claim 1, wherein said record medium is IC memory card.

4. A vehicle movement digital data analyzing apparatus as claimed in claim 1 further comprising printing means for printing the graph displayed on said display means.

* * * * *